Patented Oct. 6, 1942

2,297,911

UNITED STATES PATENT OFFICE 2,297,911

SUBSTITUTED PHENYL MALONIC ACID AND DERIVATIVE THEREOF

Joseph B. Niederl, Brooklyn, N. Y.

No Drawing. Application September 23, 1937, Serial No. 165,331

3 Claims. (Cl. 260—521)

This invention relates to the production of substituted phenyl malonic acids and certain derivatives hereof, the phenyl group being substituted in the ring by one or more radicals, such as for example, alkyl, alkoxyl and hydroxyl radicals, the said compounds also having a replaceable hydrogen atom in the methylene group of the acid radical capable of substitution by metallic sodium and hence in turn by manifold other radicals. The invention also relates to said acid compounds and their derivatives as new products.

More particularly, the compounds of the present invention may be referred to as ring substituted phenyl malonic acid compounds of the general basic formula, $R_xC_6H_yCH(COOH)_2$, the carboxylic group or groups of which may be substituted by ester groups, nitrile groups or amide groups, or by any combination of such groups, R referring to any desired substituent, as an alkyl or alkoxyl radical of low or higher molecular weight or an hydroxyl radical. Since the R component in the formula replaces the hydrogen in the ring, the sum of $x$ and $y$ naturally equals five.

Unsubstituted phenyl malonic acid having a replaceable methylene hydrogen atom is known to the prior art, but up to the time of the present invention, no one has produced and recorded any ring substituted phenyl malonic acid having such a hydrogen atom. Ring substituted phenyl malonic acid derivatives of only one type have been described in the prior art, these compounds being p-hydroxy- and p-methoxy-phenyl-ethyl malonic acid, the ethyl radical occupying the position of the methylene hydrogen atom in the above compounds. These ethyl compounds are incapable of further synthesis in the manner contemplated by the present invention.

An object of the present invention is to produce and provide ring substituted phenyl malonic acid compounds containing a methylene hydrogen atom in the acid group which because of its relationship to the carboxyl groups may be readily substituted by reaction with metallic sodium.

Another object is to produce and provide valuable key substances for use in organic chemical synthesis by introducing suitable atomic or molecular groups in the ring of phenyl malonic acid compounds having the said replaceable methylene hydrogen atom. This object may be further described as the introduction of certain highly desirable radicals into the ring of phenyl malonic acid without disturbing the enolic hydrogen atom and hence without destroying suitability of the compounds for substitution by metallic sodium.

The most important portion of the field of the present invention with respect to the compounds contemplated may be represented by the formula

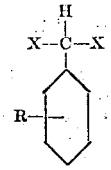

wherein R is one or more of the groups alkyl, alkoxyl and hydroxyl radicals, and the X's are of the groups —COOH, —COOR₁, —(COOH)₂ or —CN (R₁ being an esterifying radical, preferably an alkyl radical).

The present invention furthermore comprehends derivatives of the said compounds by reaction through substitution of the enolic hydrogen atom. Hence, derivatives are included which are producible by reacting with active sodium compounds, such as metallic sodium and sodium ethylate, under known conditions for such reaction, and then reacting the mono-sodium derivative with an organic halide such as for example, alkyl halides, halogenated alcohols, ethers, aldehydes, ketones, acids, acid halides and other similar compounds.

A ring substituted phenyl malonic acid compound of the present invention may be prepared according to the following procedure, wherein p-methoxy-phenyl malonic monoethyl ester nitrile is formed. Benzyl cyanide, which is a readily available raw material, is (1) nitrated in conventional manner to produce p-nitro benzyl cyanide. Next, this compound is (2) reduced to form p-amino-benzyl cyanide and then (3) diazotized to yield p-hydroxy benzyl cyanide. This hydroxy compound is next (4) methylated to form the p-methoxy-benzyl cyanide and then is subjected to (5) Chaisen condensation to form p-methoxy-phenyl malonic monoethyl ester-nitrile as hereinafter more fully described.

This p-methoxy-phenyl malonic monoethyl ester-nitrile may then be treated in accordance with conventional procedures to produce compounds included in the scope of the present invention to convert the same into various derivatives and acid compounds. For example, the ester nitrile may be converted into the amide nitrile, the diester or the mono ester. The amide nitrile and as well the diester may be converted into the diamide, or the diester may be hydrolyzed to form the diacid, all as hereinafter more fully described.

The ester nitrile formed by the Claisen condensation may be converted into other related compounds by treatment under normal alkylation processes. For example, its sodium derivatives may be reacted with methyl iodide or ethyl bromide, respectively, to produce the p-methoxy-phenyl-methyl- and the p-methoxy-phenyl-ethylmalonic acid ester-nitrile. These compounds may be converted into their respective amide nitriles by treatment with concentrated ammonium hydroxide solution. The compound a-(p-methoxy)-phenyl propinic acid may be formed by the hydrolysis of the p-methoxy-phenyl-methyl malonic acid ester-nitrile.

Many other useful derivatives of the basic compounds may be easily produced, the utility of the compounds of the present invention as key substances in aromatic synthesis therefore being readily apparent. For example, the sodium compound of either the p-methoxy-phenol malonic acid ester-nitrile or its diethyl ester may be reacted in molar proportions with 1, 2-di-halo-ethane, thereby producing the corresponding substituted malonic acid derivative, which derivatives are capable of further synthesis, such as through reaction with ammonia, or amines, or ring closure, by a distillation over calcium oxide to yield the corresponding hydrindene compound, the 1-cyano-5-methoxy-indane. In the above reaction, instead of employing a 1, 2 di-bromo-ethane, there can be used 1, 3-di-bromo-propane, in which case 1-cyano-6-methoxy-1,2,3,4-tetrahydronaphthalene is synthesized, which substance constitutes a suitable and convenient starting product for the synthesis of certain phenanthrene compounds. By treating the sodium salt of the di-ester or the ester nitrile of the ring substituted phenol malonic acid with halogen acids or acid chlorides, the corresponding substituted poly or ketone acids are obtained.

An additional synthesis reaction involves the treatment of the above mentioned sodium compound with beta-bromo-ethyl-phthalimide, which, if followed by hydrolysis, leads to aromatic amino compounds of the phenol-alkyl-amine type.

One of the features of the products of this invention is their suitability for substitution at one or more of the remaining four hydrogen atoms in the ring by other atomic or molecular groupings. Hence through the application of suitable halogenation methods, one or more of the ring hydrogens may be replaced by halogens, such as, chlorine, bromide or iodine. In accordance with another variation, by nitration, nitro groups may be introduced, which in turn may be reduced to the corresponding amino groups by known methods.

Sulfonation produces mono- and di-sulfonic acids. From the mono sulfonic acid the amide can be prepared yielding a benzene-sulfonic acid amide, possessing a methylenic hydrogen atom in the side chain, which is capable for interaction with metallic sodium. Hence the introduction of a large variety of various organic chemical radicals, or molecular grouping is possible producing new series of substituted benzene sulfonic acid amides of definite bacteriological significance.

Further usefulness of the compounds of the present invention is obvious from the consideration that in any of the foregoing examples, the carboxyl groups may be removed by any of the conventional methods to yield the corresponding anisole compounds. Furthermore the methoxy group in these compounds and derivatives may be eliminated by any of the usual methods, for example, the Zeisel reaction, whereby the corresponding phenolic compounds are obtained.

The value of the instant compounds is also apparent from the fact that the sodium compounds of the original p-methoxy-phenol malonic acid diethyl ester or the ester-nitrile are capable of reaction with almost any halide. Therefore, these substances comprise an important key for the preparation of a large number of substituted phenols of varying structure in which the substituted group may be an alkyl radical, an acid radical, an amino group or a combination of such groups or rings.

EXAMPLE 1

*p-Methoxy-phenylmalonic acid ethyl-ester-nitrile*

One mol of freshly distilled diethylcarbonate is added to a mixture of one atomic weight equivalent of clean sodium cut or sodium dust and 300 cc. of anhydrous ether, the resulting mass being thoroughly stirred. Next one mol of p-methoxy-benzyl-cyanide is slowly added, as through the aid of a separatory funnel. The reaction mass is left standing for a period of several hours, suitably over night, and then boiled under reflux condensation for a period of several hours. After the mass is cool, it is acidified with ice-cold 25% sulphuric acid and is then extracted with ether, after which the ether extract is washed with a 5% sodium carbonate solution to remove the small amount of anisic acid which forms as a by-product.

The ether is evaporated off and the remaining oil is fractionally distilled. The product obtained is p-methoxy-phenyl malonic acid, ethyl-ester-nitrile. Yield: 50–55%. B. P. 152–153° C. (2 mm.); sp. gr.:1.148 (24° C.); $n^{23}{}_D$:1.5175.

EXAMPLE 2

*p-Methoxy-phenylmalonic acid nitrile-amide*

One gram of the ester-nitrile prepared in accordance with the procedure of Example 1 is dissolved in 8 cc. of concentrated ammonium hydroxide solution. The solution is permitted to stand for a period of about one hour, during which time p-methoxy malonic acid amide-nitrile crystalizes out in a yield of approximately 80%. Purification may be accomplished by recrystallization through the use of a 50% alcohol solution. The purified product has a melting point of 144–145° C.

This same general process may be employed in the preparation of amide-nitriles from any of the substituted p-methoxy-phenol malonic acid compounds herein described.

EXAMPLE 3

*p-Methoxy-phenylmalonic acid*

One gram of the ester-nitrile produced in accordance with Example 1 or the di-ethyl ester is mixed with 15 cc. of ether and 20 cc. of sodium hydroxide solution (3% or 6%) and shaken for a period of two hours. Thereafter the ether layer is separated and the aqueous solution neutralized with hydrochloric acid. An insoluble oil separates out and is removed. Crystallization occurs in aqueous solution after the same has been allowed to stand. The recrystallized product has a melting point of 137–138° C.

EXAMPLE 4

*p-Methoxy-phenylmalonic acid di-ethyl ester*

5.3 grams of the ester-nitrile produced in accordance with Example 1 is mixed with 8 cc. of ethyl alcohol and 0.25 cc. of water. This solution is next introduced into a reflux distilling flask provided with gas inlet tube of fine bore. Dry hydrogen chlorine gas is then bubbled through the mixture at a moderate rate, during which introduction the temperature of the mixture usually rises. During this treatment, ammonium chloride precipitates out in the flask. The mixture in the flask is then heated under reflux condensation for a period of 15 minutes, during which time the hydrogen chloride gas is continuously introduced. At the completion of this period, the mass is then cooled in an ice salt bath and again saturated and allowed to stand for several hours, for example, over night. Next the solution is boiled under reflux condensation for an additional hour, after which it is cooled and poured into water. The resulting reaction mass is then extracted with ether, the ether layer next being washed with sodium carbonate solution, then with water, and being dried through the use of calcium chloride. The ether is then removed by evaporation and the product distilled, constituting p-methoxy-phenyl malonic acid diethyl ester. B. P.:152–153° C. (2.5. mm.); sp. gr.: 1.115 (24°) $n^{23°}_D$:1.4995.

Example 5 p-Methoxy-phenylmalonic acid mono ethyl ester

The sodium carbonate solution obtained in the washing operation described in Example 4 is neutralized with hydrochloric acid, with the result that 0.1 gram of p-methoxy-phenyl malonic acid monoethyl ester is formed and precipitates out. The ester may be purified by recrystallization from a mixture of ether and petroleum ether. It possesses a melting point of 77–78° C. This mono-ester may be further saponified through a treatment of the same with a 3% solution of sodium hydroxide, the product being neutralized with dilute hydrochloric acid yielding a free p-methoxy-phenyl malonic acid.

Example 6 p-Methoxy-phenylmalonic acid di-amide 10 cc. of an ammonium hydroxide solution is mixed with 0.8 gram of the di-ester as produced in accordance with Example 4. The ester does not go into the solution immediately but requires an extended time, the same being accomplished by agitation for a period of 6 hours. The resulting ammoniacal solution is then filtered and allowed to remain quiescent. Within a short time, crystals form in the shape of long needles, these crystals being composed of p-methoxy phenyl malonic acid di-amide. The product may be recrystallized easily through the use of a 30% alcohol solution. It possesses a melting point of about 190–191° C.

Example 7 p-Methoxy-phenyl-methyl-malonic acid derivatives.

A solution in absolute alcohol of one mol equivalent of p-methoxy-phenylmalonic acid ethyl-ester-nitrile as prepared in example 1, is mixed with a solution in the same solvent of one mol equivalent of sodium alcoholate. To the resulting solution of the sodium enolate of p-methoxy-phenyl-malonic acid ethyl-ester-nitrile contained in a round bottomed flask provided with a reflux condenser and a dropping funnel, one mol equivalent of methyl iodide is slowly added. After addition of the iodide the mixture is refluxed for a short time. The sodium iodide precipitates out quantitatively. The alcoholic solution of the methylated p-methoxy-phenyl-malonic acid ethyl-ester-nitrile is filtered and the alcohol distilled off under diminished pressure. The residue is suspended in water and repeatedly extracted with ether. The combined ether extracts are dried. The ether is then distilled off and the residue is finally fractionally distilled in vacuo.

Yield: 85–90%. B. P.: 136–138° C. (0.5 mm.); sp. gr.: 1.143 (24° C.); $n^{23°}_D$: 1.5106.

When the compound is treated with ammonia as described in example 2, the corresponding nitrile-amide, the p-methoxy-phenyl-methyl-malonic acid amide-nitrile is produced. M. P.: 143–144 C.

Example 8 p-Methoxy-phenyl-ethyl-manolic acid derivatives.

A solution in absolute alcohol of one mol equivalent of p-methoxy-phenylmalonic acid ethyl-ester-nitrile as prepared in example 1, is mixed with a solution in the same solvent of one mol equivalent of sodium alcoholate. To the resulting solution of the sodium enolate of p-methoxy-phenyl-malonic acid ethyl-ester-nitrile contained in a round bottomed flask provided with a reflux condensor and a dropping funnel, one mol equivalent of ethyl bromide is slowly added. After addition of the bromide the mixture is refluxed for a short time. The sodium bromide precipitates out quantitatively. The alcoholic solution of the ethylated p-methoxy-phenylmalonic acid ethyl-ester-nitrile is filtered and the alcohol distilled off under diminished pressure. The residue is suspended in water and repeatedly extracted with ether. The combined ether extracts are dried. The ether is then distilled off and the residue is fractionally distilled in vacuo.

Yield: 85–90%. B. P. 142–143° C. (0.5 mm.); sp. gr. 1.139 (24° C.); $n^{23°}_D$: 1.5090.

When the compound is treated with ammonia as described in Example 2, the corresponding nitrile-amide, the p-methoxy-phenyl-ethyl-malonic acid amide-nitrile is produced. M. P.: 138° C.

In a simple manner any alkyl halide (chloride, bromide and iodide) can be used and brought into interaction with the sodium enolate of the p-methoxy-phenylmalonic acid ethyl-ester-nitrile. The working up procedure as well as the method of purification may be varied in each of the foregoing examples without departing from the broader scope of this invention.

I claim:

1. As a new compound, a derivative of the general formula

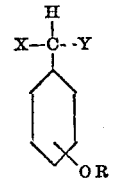

wherein R is an alkyl radical and X and Y are each a radical selected from the group consisting of —COOH, —CONH$_2$ and —COOR$_1$ in which R$_1$ represents an esterifying radical.

2. As a new compound, p-methoxy phenyl malonic acid.

3. As a new compound, an alkoxy phenyl malonic acid.

JOSEPH B. NIEDERL.

CERTIFICATE OF CORRECTION.

Patent No. 2,297,911. October 6, 1942.

JOSEPH B. NIEDERL.

It is hereby certified that error appears in the printed specification of the above numbered patent requiring correction as follows: Page 1, first column, line 32, after "have" insert --been--; and second column, line 39, for "Chaisen" read --Claisen--; page 2, first column, line 46, for "bromide" read --bromine--; and second column, line 40, for "p-methoxy" read --p-methoxy-phenyl--; page 3, second column, line 46, for "simple" read --similar--; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.